United States Patent
Hinrichs et al.

(10) Patent No.: US 12,406,137 B2
(45) Date of Patent: Sep. 2, 2025

(54) RISK PERCEPTION NORMALIZATION SYSTEM AND METHOD

(71) Applicant: TSG Technologies, LLC, St. Louis, MO (US)

(72) Inventors: Anthony Hinrichs, Webster Groves, MO (US); Andrew Kettmann, O'Fallon, MO (US); Joshua McNiff, St. Charles, MO (US); Nick Niemeyer, University City, MO (US)

(73) Assignee: TSG TECHNOLOGIES, LLC, Brentwood, MO (US)

( * ) Notice: Subject to any disclaimer, the term of this patent is extended or adjusted under 35 U.S.C. 154(b) by 205 days.

(21) Appl. No.: 18/242,370

(22) Filed: Sep. 5, 2023

(65) Prior Publication Data

US 2024/0086634 A1 Mar. 14, 2024

Related U.S. Application Data

(60) Provisional application No. 63/405,291, filed on Sep. 9, 2022.

(51) Int. Cl.
*G06F 40/205* (2020.01)
*G06N 20/00* (2019.01)

(52) U.S. Cl.
CPC .......... *G06F 40/205* (2020.01); *G06N 20/00* (2019.01)

(58) Field of Classification Search
CPC .................................................. G06N 20/00
See application file for complete search history.

(56) References Cited

U.S. PATENT DOCUMENTS

| | | | | |
|---|---|---|---|---|
| 2004/0122858 A1* | 6/2004 | Clearwater | ............ | G06Q 40/04 |
| 2005/0021360 A1* | 1/2005 | Miller | .................... | G06Q 10/08 |
| | | | | 705/7.28 |
| 2006/0095251 A1* | 5/2006 | Shaw | ...................... | G10L 15/08 |
| | | | | 704/9 |
| 2012/0221485 A1* | 8/2012 | Leidner | .................. | G06Q 40/08 |
| | | | | 705/36 R |
| 2012/0226519 A1* | 9/2012 | Copeland | ........... | G06Q 10/0635 |
| | | | | 705/7.28 |
| 2014/0053069 A1* | 2/2014 | Yan | .................... | G06Q 10/0635 |
| | | | | 715/259 |
| 2018/0300323 A1* | 10/2018 | Lee | ........................ | G06F 16/353 |
| 2020/0226510 A1* | 7/2020 | Gupta | .................... | G06Q 50/18 |

* cited by examiner

*Primary Examiner* — Jesse S Pullias
(74) *Attorney, Agent, or Firm* — PATENT PORTFOLIO BUILDERS PLLC

(57) ABSTRACT

A system includes at least one processor to ingest a corpus of a plurality of documents that comprises training data, parse each document in the corpus of the plurality of documents to determine a word count and a raw risk for each document, determine a normalized risk for each document in the corpus of the plurality of documents using the word count and the raw risk based on an expected mean and an expected standard deviation based on a power risk that equals raw risk$^{0.39}$ for the corpus of the plurality of documents, receive a new document, parse the new document to determine a word count and a raw risk, and determine a normalized risk for the new document based on the expected mean and the expected standard deviation based on the power risk that equals raw risk$^{0.39}$ for the corpus of the plurality of documents.

17 Claims, 8 Drawing Sheets

RISK PERCEPTION NORMALIZATION SYSTEM AND METHOD

CROSS-REFERENCE TO RELATED APPLICATIONS

This application claims priority under 35 U.S.C. § 119 to U.S. Patent Application No. 63/405,291, filed Sep. 9, 2022 entitled "Risk Perception Normalization System and Method," the entire contents of which is incorporated herein by reference.

BACKGROUND

When a news item, article, opinion, or other publication is disseminated to an audience, there is a risk that the audience will have an emotional response to the publication. In at least some known systems, detecting the emotional response occurs after the audience in question has already begun to take action, for example by generating a responsive publication, protesting, purchasing a particular item, or refraining from purchasing a particular item. In other words, a risk of an emotional response is not detected or measured before the audience takes action. Accordingly, any opportunity to take corrective measures to mitigate a risk of the emotional response has passed by the time the emotional response is detected.

It is with these issues in mind, among others, that various aspects of the disclosure were conceived.

SUMMARY

The present disclosure is directed to a risk perception normalization system and method. The system may include a server computing device to determine a risk value associated with a document for risk factors such as nineteen different risk factors. The server computing device may ingest a corpus of documents that may include at least one hundred million documents. Each of the documents may be associated with a social media post, a blog post, an article, or another type of document that may include text having one or more characters and one or more words. For each of the documents in the corpus of documents, the server computing device may determine a risk factor score for nineteen different risk factors. Additionally, the server computing device may determine a mean and a standard deviation for a value known as power risk that is based on a raw risk value that is computed based on each of the nineteen different risk factors. An expected mean and an expected standard deviation may be determined based on a number of words in the document. The server computing device may then use the expected mean and the expected standard deviation to determine a normalized risk or RiskNormal that is a value for the document that is based on the nineteen different risk factors. As a result, the server computing device can receive a new document and determine a normalized risk for the new document based on the mean and the standard deviation related to the corpus of documents. When the normalized risk is above a particular threshold, the server computing device can send an alert in realtime that indicates the normalized risk is above the particular threshold. In addition, the server computing device may post an automated response in realtime to at least one social media platform when the percentage value that indicates the normalized risk of the new document in comparison documents having the same word count in the corpus of the plurality of documents is above the particular threshold.

In one example, a system may include a memory storing computer-readable instructions and at least one processor to execute the instructions to ingest a corpus of a plurality of documents that comprises training data, parse each document in the corpus of the plurality of documents to determine a word count and a raw risk for each document, determine a normalized risk for each document in the corpus of the plurality of documents using the word count and the raw risk based on an expected mean and an expected standard deviation based on a power risk that equals raw $risk^{0.39}$ for the corpus of the plurality of documents, receive a new document, parse the new document to determine a word count and a raw risk, determine a normalized risk for the new document based on the expected mean and the expected standard deviation based on the power risk that equals raw $risk^{0.39}$ for the corpus of the plurality of documents, and generate a percentage value that indicates the normalized risk of the new document in comparison to documents having a same word count in the corpus of the plurality of documents.

In another example, a method may include ingesting, by at least one processor, a corpus of a plurality of documents that comprises training data, parsing, by the at least one processor, each document in the corpus of the plurality of documents to determine a word count and a raw risk for each document, determining, by the at least one processor, a normalized risk for each document in the corpus of the plurality of documents using the word count and the raw risk based on an expected mean and an expected standard deviation based on a power risk that equals raw $risk^{0.39}$ for the corpus of the plurality of documents, receiving, by the at least one processor, a new document, parsing, by the at least one processor, the new document to determine a word count and a raw risk, determining, by the at least one processor, a normalized risk for the new document based on the expected mean and the expected standard deviation based on the power risk that equals raw $risk^{0.39}$ for the corpus of the plurality of documents, and generating, by the at least one processor, a percentage value that indicates the normalized risk of the new document in comparison to documents having a same word count in the corpus of the plurality of documents.

In another example, a non-transitory computer-readable storage medium may have instructions stored thereon that, when executed by a computing device cause the computing device to perform operations, the operations including ingesting a corpus of a plurality of documents that comprises training data, parsing each document in the corpus of the plurality of documents to determine a word count and a raw risk for each document, determining a normalized risk for each document in the corpus of the plurality of documents using the word count and the raw risk based on an expected mean and an expected standard deviation based on a power risk that equals raw $risk^{0.39}$ for the corpus of the plurality of documents, receiving a new document, parsing the new document to determine a word count and a raw risk, determining a normalized risk for the new document based on the expected mean and the expected standard deviation based on the power risk that equals raw $risk^{0.39}$ for the corpus of the plurality of documents, and generating a percentage value that indicates the normalized risk of the new document in comparison to documents having a same word count in the corpus of the plurality of documents.

These and other aspects, features, and benefits of the present disclosure will become apparent from the following detailed written description of the preferred embodiments and aspects taken in conjunction with the following drawings, although variations and modifications thereto may be effected without departing from the spirit and scope of the novel concepts of the disclosure.

BRIEF DESCRIPTION OF THE DRAWINGS

The accompanying drawings illustrate embodiments and/or aspects of the disclosure and, together with the written description, serve to explain the principles of the disclosure. Wherever possible, the same reference numbers are used throughout the drawings to refer to the same or like elements of an embodiment, and wherein.

DETAILED DESCRIPTION

Figure 1:
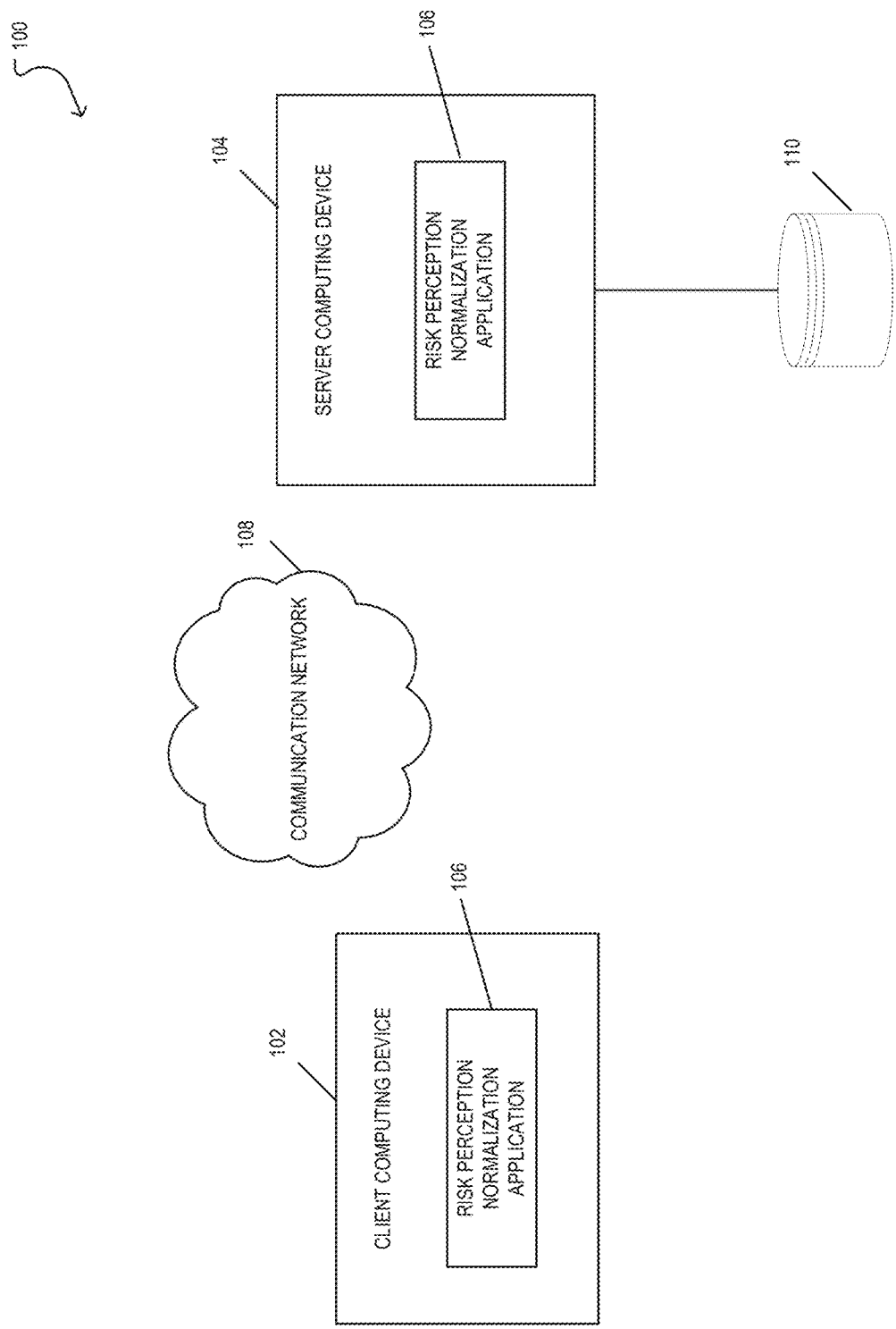
FIG. 1 shows a block diagram of a risk perception normalization system according to an example of the instant disclosure.

The present invention is more fully described below with reference to the accompanying figures. The following description is exemplary in that several embodiments are described (e.g., by use of the terms "preferably," "for example," or "in one embodiment"); however, such should not be viewed as limiting or as setting forth the only embodiments of the present invention, as the invention encompasses other embodiments not specifically recited in this description, including alternatives, modifications, and equivalents within the spirit and scope of the invention. Further, the use of the terms "invention," "present invention," "embodiment," and similar terms throughout the description are used broadly and not intended to mean that the invention requires, or is limited to, any particular aspect being described or that such description is the only manner in which the invention may be made or used. Additionally, the invention may be described in the context of specific applications; however, the invention may be used in a variety of applications not specifically described.

The embodiment(s) described, and references in the specification to "one embodiment", "an embodiment", "an example embodiment", etc., indicate that the embodiment(s) described may include a particular feature, structure, or characteristic. Such phrases are not necessarily referring to the same embodiment. When a particular feature, structure, or characteristic is described in connection with an embodiment, persons skilled in the art may effect such feature, structure, or characteristic in connection with other embodiments whether or not explicitly described.

In the several figures, like reference numerals may be used for like elements having like functions even in different drawings. The embodiments described, and their detailed construction and elements, are merely provided to assist in a comprehensive understanding of the invention. Thus, it is apparent that the present invention can be carried out in a variety of ways, and does not require any of the specific features described herein. Also, well-known functions or constructions are not described in detail since they would obscure the invention with unnecessary detail. Any signal arrows in the drawings/figures should be considered only as exemplary, and not limiting, unless otherwise specifically noted. Further, the description is not to be taken in a limiting sense, but is made merely for the purpose of illustrating the general principles of the invention, since the scope of the invention is best defined by the appended claims.

It will be understood that, although the terms "first," "second," etc. may be used herein to describe various elements, these elements should not be limited by these terms. These terms are only used to distinguish one element from another. Purely as a non-limiting example, a first element could be termed a second element, and, similarly, a second element could be termed a first element, without departing from the scope of example embodiments. As used herein, the term "and/or" includes any and all combinations of one or more of the associated listed items. As used herein, the singular forms "a", "an," and "the" are intended to include the plural forms as well, unless the context clearly indicates otherwise. It should also be noted that, in some alternative implementations, the functions and/or acts noted may occur out of the order as represented in at least one of the several figures. Purely as a non-limiting example, two figures shown in succession may in fact be executed substantially concurrently or may sometimes be executed in the reverse order, depending upon the functionality and/or acts described or depicted.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Aspects of a risk perception normalization system and method includes a server computing device to determine a risk value associated with a document for risk factors such as nineteen different risk factors. The server computing device may ingest a corpus of documents that may include at least one hundred million documents. Each of the documents may be associated with a social media post, a blog post, an article, or another type of document that may include text having one or more characters and one or more words. For each of the documents in the corpus of documents, the server computing device may determine a risk factor score for nineteen different risk factors. Additionally, the server computing device may determine a mean and a standard deviation for a value known as power risk that is based on a raw risk value that is computed based on each of the nineteen different risk factors. An expected mean and an expected standard deviation may be determined based on a number of words in the document. The server computing device may then use the expected mean and the expected standard deviation to determine a normalized risk or Risk-Normal that is a value for the document that is based on the nineteen different risk factors. As a result, the server computing device can receive a new document and determine a normalized risk for the new document based on the mean and the standard deviation related to the corpus of documents.

The risk perception normalization system provides normalized risk perception through automated analysis. This may allow relevant stakeholders to be informed of critical documents and anticipate likely audience response before the audience takes action. This may, for example, provide an opportunity to produce a counter-point statement to a consumer's blog points before that post. "goes viral" and causes a negative impact to product sales.

The server computing device can send an alert to a computing device such as one or more client computing devices that indicates that the normalized risk for the new document is greater than a particular threshold or less than a particular threshold. This alert may be used to perform actions to address the risk in the new document before it is too late to take action. The alert may be an automated and/or real-time alert. These actions may include automatically responding in the same media channel (for example, refuting a claim that a product is defective), proactively developing a press release, or counter-messaging in other channels. These alerts can also be generated when a collection of documents (for example, all documents from a particular media channel) change over time. In this situation, similar responses are available.

As an example, a system may include a memory storing computer-readable instructions and at least one processor to execute the instructions to ingest a corpus of a plurality of documents that comprises training data, parse each document in the corpus of the plurality of documents to determine a word count and a raw risk for each document, determine a normalized risk for each document in the corpus of the plurality of documents using the word count and the raw risk based on an expected mean and an expected standard deviation based on a power risk that equals raw risk$^{0.39}$ for the corpus of the plurality of documents, receive a new document, parse the new document to determine a word count and a raw risk, determine a normalized risk for the new document based on the expected mean and the expected standard deviation based on the power risk that equals raw risk$^{0.39}$ for the corpus of the plurality of documents, and generate a percentage value that indicates the normalized risk of the new document in comparison to documents having a same word count in the corpus of the plurality of documents.

There have been conventional ways to determine a risk of an emotional response of an audience. The system discussed herein utilizes a large dataset to develop a system of normalization allowing for an interpretation of normalized risk as a percentile compared to other documents having a similar word count. In one example, a document is parsed for word count and for a raw risk or RawRisk. The two factors including word count and RawRisk can be combined using a normalization algorithm. A resulting calculation can be "normalized risk" or simply known as "risk." However, the risk factor or RawRisk was not easy to interpret and could not be understood in a general context. It only could be interpreted in comparison to other scored documents. By utilizing a corpus of over one hundred million documents and scoring each of the one hundred million documents, RawRisk can be understood in a massive dataset. Additionally, it is possible to report percentile of a document in comparison to the reference corpus. In other words, a document having a score of 62.8 has a higher risk than 62.8% of documents with a same word count in the corpus. In conventional approaches, a RawRisk score of, say, 7.3, would only be understood by someone well-trained and with historical knowledge. However, the RawRisk score generated by the system can be understood by a layman, because the idea of "scoring in the 63$^{rd}$ percentile" is used for everything from standardized academic placement tests to infant growth.

In order to strengthen the use and interpretability of the risk perception algorithm, there are novel features to be added. The first of these features is the use of cosine similarity for the comparison of term vectors. This replaces the use of the Pearson correlation coefficient in prior versions. The second change is the normalization of overall risk perception to a 0-100 scale. The normalization is based on an extensive data set. It features empirically derived quantified mean and standard deviation measurements with number of words as the key independent variable in the regression model. There are a number of advantages associated with this system. In particular, determinations and calculations can be executed on each new document without having to analyze the document in comparison with each of the one hundred million documents as done conventionally. This provides major computational efficiencies and savings of processing cycles. Power calculations and modeling of mean and standard deviation for normal curves can be executed to improve upon computation time as well as improve computing efficiencies. As a result, resulting document scores can be interpreted and understood.

Use of a very large dataset provides unique advantages. PowerRisk is discussed herein and is used to provide very efficient determinations of risk perception. A mixture of linear and non-linear regression models for mean and standard deviation are also applied to risk perception.

Briefly, risk perception is the subjective judgement that people make about the characteristics and severity of a risk. In behavioral science, perceived risk is a key driver of action. Risk perception score is built upon this academic research. Using research from Slovic ("Perception of risk." Science 236.4799 (1987): 280-285) and others, the system scores documents based on nineteen distinct risk factors.

Each document is scored for each of the nineteen risk factors. In previous implementations, this score has been computed as a Pearson correlation between the terms from the document in question (a "term vector") and a "Prototype Vector", a recorded term vector based on prior research. This correlation yields a number between −1 and 1. Conventionally, the absolute value of this score was used to yield a score from 0 to 1 in each risk factor. When no elements of a risk factor are present in the document, this results in a score of 0. A weighted linear combination of these factors combines to create the "Raw Risk", a number between 0 and 100, where zero indicates that no elements of any of the nineteen risk factors are present. Although Raw Risk is on a 0 to 100 scale, this lacks normalization data. Thus, while it is possible to compare Raw Risk between documents with the same number of words, there is no overall perspective on the frequency or impact of any given Raw Risk score.

Pearson Correlation Updated to Cosine Similarity

The previous risk perception framework scored a document for each one of nineteen drivers using the Pearson correlation against a weighted Prototype Vector. The analysis also takes synonyms into account with an "anchor" vocabulary file. Since it is Pearson correlation, each driver then had a score from −1.0 to 1.0. The "overall risk" (or Raw Risk) metric was computed as a weighted combination of the nineteen factors, resulting in a final score potentially from −100 to 100. However, the presence of negative risk drivers was unintended and became problematic. Previously, the absolute value of the Pearson correlation was used. While this yields a score from 0 to 1 for each driver, and an overall score from 0 to 100, it resulted in some anomalies: a driver score of −1.2 would then be recorded as higher risk than a driver score of 0.8.

The system utilizes cosine similarity that is adopted for the determination of risk perception. Cosine similarity is well suited to language tasks. Formally, for two non-zero vectors, A and B, we have the Euclidean dot product formula:

$$A \cdot B = \|A\| \|B\| \cos \theta$$

Cosine similarity is defined to be $$S = \cos(\theta) = \frac{A \cdot B}{\|A\|\|B\|}$$

In a general setting, S is a value between −1 and 1, where 1 means the vectors are identical, −1 means they are opposite, and 0 means they are orthogonal or uncorrelated. In a language processing setting, term vectors only have non-negative values (with a zero indicating that a term is not present in the document), and thus, cosine similarity only provides values between 0 and 1.

Based on this more intuitive use, cosine similarity provides a number of advantages over the absolute value of the Pearson correlation.

Normalization of Overall Risk

In order to improve the interpretability of the risk score, research to understand normalization was conducted. In particular, the goal was to produce a final score from 0 to 100 which would correspond to the quantile (or percentile) based on a large collection of documents (the "corpus"). For example, a score of 63.2 for a document could indicate that the document exceeds the Raw Risk score for 63.2% of documents in the corpus.

An initial design decision was to keep the "structural zeros" as zeros. Any document that contained no risk perception terms would have a Raw Risk of zero. In this case, it is possible to assign the normalized risk score as zero. Documents with a Raw Risk of zero can be removed from the corpus. In addition, documents that are duplicated can be removed from the corpus. Thus, according to an example, a final corpus contained 100,090,577 documents. These are English language documents received into a data warehouse. The documents are from a wide variety of digital media sources, including social media such as TWITTER, blogs, news, and forums.

A document may be a communication from a single point in time (e.g., "publication time") written by a distinct author (or authors). These could include a single post on a social media network, e.g., TWITTER, (and each response is a separate document), a single newspaper article, a single blog post, and so on. In practice, each document is given a unique 128-bit identifier (called a UUID), encoded as a raw JSON object, and stored in a database. Additional meta-data, such as date of release, author names, URL, etc., can be stored along with the JSON object.

The system may utilize relationships with organizations which disseminate documents, called providers. The providers may be commercial or free to use, and may be directly responsible for the documents (such as Reddit) or may act as redistributors (for example, GNIP is a reseller of Twitter documents). Documents in the data warehouse have been brought in through an ingest process. This typically involves connecting to a provider's application programming interface (API) and receiving documents as they are published (streaming ingest), or requesting all documents published within a certain window of time (for example, all documents published in the last 60 minutes) (batch ingest). A document validation and quality control (QC) process is performed, and documents can be permanently stored in the warehouse.

In order to determine quantiles, distribution of Raw Risk score is examined in the corpus. Previously, it has been determined that the distribution changed dramatically based on the media channel, but the number of words in a document is a tremendous independent variable. In addition, analysis of distribution of Raw Risk is performed, by binning the documents by word count ("wordCount"). However, the distribution was still substantially non-normal and would be difficult to generate a normalization. As a result, the system examines a variety of transformations and analyzes mean, variance, skewness, and kurtosis of the distribution. In this case, the system utilizes power transformations. In particular, it was determined that within the family of power transformations, using $$\text{PowerRisk} = (\text{RawRisk})^{0.39}$$

achieves zero skewness and kurtosis of 2.6, very close to the normal value of 3.0.

PowerRisk is then used for subsequent analysis. In particular, the system performs regression analysis on the observed mean and standard deviation of PowerRisk. It was determined that few documents in the corpus have more than 3000 words. Furthermore, there were clear asymptotic values of mean and standard deviation of PowerRisk at that level, so the overall value can be used as a fixed point in the regression.

For mean, PowerRisk is linear in wordCount up to 53 words and is linear in ln(wordCount) for wordCount between 53 and 3000 words. In particular, if wordCount<53, expectedMean=0.0178*(wordCount−1)+1.3 and if wordCount>=53, then have expectedMean=0.3559*(ln(wordCount)−ln(3000))+ 3.6782

For standard deviation, there can be a piecewise linear solution with three pieces. If wordCount<22, expectedStdDev=0.6281 if word Count >= 22 and word Count <= 433

$$\text{expected } StdDev = \frac{0.365 - 0.6281}{433 - 22} * (\text{word Count} - 22) + 0.6281$$

Finally, if word Count > 433

$$\text{expected } StdDev = \frac{0.5147 - 0.365}{3000 - 433} * (\text{word Count} - 433) + 0.365$$

Finally, the system can utilize the expected mean and expected standard deviation to compute a cumulative density function (cdf) for the best fit distribution in question. The p-value of the PowerRisk in the distribution is then determined. This provides a value from 0 to 1 (the quantile). By multiplying by 100, the system determines a percentile. This can be reported as RiskNormal, or simply as "Risk."

These two novel features of the risk perception allow for increased interpretability and ease of use. Using cosine similarity instead of Pearson correlation can avoid the counter-intuitive negative correlations. The normalization is much more significant. The new "Risk" is based on number of words in the document using a training set based on a very large corpus of English documents from a variety of sources. This final score is a percentile, so that a score of 63.2 indicates that this document exceeds the Raw Risk score 63.2% of documents of the same word count in training data.

This final "Risk" score can then be used for a variety of purposes, especially to understand the propensity of action for the author of a document, and for the call to action for those reading the document.

FIG. 1 is a block diagram of a risk perception normalization system 100 according to an example of the instant disclosure. The system 100 may include at least one client computing device 102 and at least one server computing device 104. The at least one server computing device 104 may be in communication with at least one database 110.

The client computing device 102 and the server computing device 104 may have a risk perception normalization application 106 that may be a component of an application and/or service executable by the at least one client computing device 102 and/or the server computing device 104. For example, the risk perception normalization application 106 may be a single unit of deployable executable code or a plurality of units of deployable executable code. According to one aspect, the risk perception normalization application 106 may include one component that may be a web application, a native application, and/or an application (e.g., an app) downloaded from a digital distribution application platform that allows users to browse and download applications developed with software development kits (SDKs) including the APPLE® iOS App Store and GOOGLE PLAY®, among others.

The data stored in the at least one database 110 may be associated with the risk perception normalization application 106 including the plurality of documents as well as representations of the plurality of documents, risk factor information, and risk factor score information associated with each document, among other information. The at least one database 110 may include one or more data warehouses that comprise the corpus of documents, representations of the corpus of documents, risk factor information associated with the corpus of documents, and risk factor score information associated with the corpus of documents.

The at least one client computing device 102 and the at least one server computing device 104 may be configured to receive data from and/or transmit data through a communication network 108. Although the client computing device 102 and the server computing device 104 are shown as a single computing device, it is contemplated each computing device may include multiple computing devices.

The communication network 108 can be the Internet, an intranet, or another wired or wireless communication network. For example, the communication network may include a Mobile Communications (GSM) network, a code division multiple access (CDMA) network, 3$^{rd}$ Generation Partnership Project (GPP) network, an Internet Protocol (IP) network, a wireless application protocol (WAP) network, a WiFi network, a Bluetooth network, a near field communication (NFC) network, a satellite communications network, or an IEEE 802.11 standards network, as well as various communications thereof. Other conventional and/or later developed wired and wireless networks may also be used.

The client computing device 102 may include at least one processor to process data and memory to store data. The processor processes communications, builds communications, retrieves data from memory, and stores data to memory. The processor and the memory are hardware. The memory may include volatile and/or non-volatile memory, e.g., a computer-readable storage medium such as a cache, random access memory (RAM), read only memory (ROM), flash memory, or other memory to store data and/or computer-readable executable instructions. In addition, the client computing device 102 further includes at least one communications interface to transmit and receive communications, messages, and/or signals.

The client computing device 102 could be a programmable logic controller, a programmable controller, a laptop computer, a smartphone, a personal digital assistant, a tablet computer, a standard personal computer, or another processing device. The client computing device 102 may include a display, such as a computer monitor, for displaying data and/or graphical user interfaces. The client computing device 102 may also include a Global Positioning System (GPS) hardware device for determining a particular location, an input device, such as one or more cameras or imaging devices, a keyboard or a pointing device (e.g., a mouse, trackball, pen, or touch screen) to enter data into or interact with graphical and/or other types of user interfaces. In an exemplary embodiment, the display and the input device may be incorporated together as a touch screen of the smartphone or tablet computer.

The server computing device 104 may include at least one processor to process data and memory to store data. The processor processes communications, builds communications, retrieves data from memory, and stores data to memory. The processor and the memory are hardware. The memory may include volatile and/or non-volatile memory, e.g., a computer-readable storage medium such as a cache, random access memory (RAM), read only memory (ROM), flash memory, or other memory to store data and/or computer-readable executable instructions. In addition, the server computing device 104 further includes at least one communications interface to transmit and receive communications, messages, and/or signals.

As an example, the client computing device 102 and the server computing device 104 communicate data in packets, messages, or other communications using a common protocol, e.g., Hypertext Transfer Protocol (HTTP) and/or Hypertext Transfer Protocol Secure (HTTPS). The one or more computing devices may communicate based on representational state transfer (REST) and/or Simple Object Access Protocol (SOAP). As an example, a first computer (e.g., the client computing device 102) may send a request message that is a REST and/or a SOAP request formatted using Javascript Object Notation (JSON) and/or Extensible Markup Language (XML). In response to the request message, a second computer (e.g., the server computing device 104) may transmit a REST and/or SOAP response formatted using JSON and/or XML.

Figure 2:
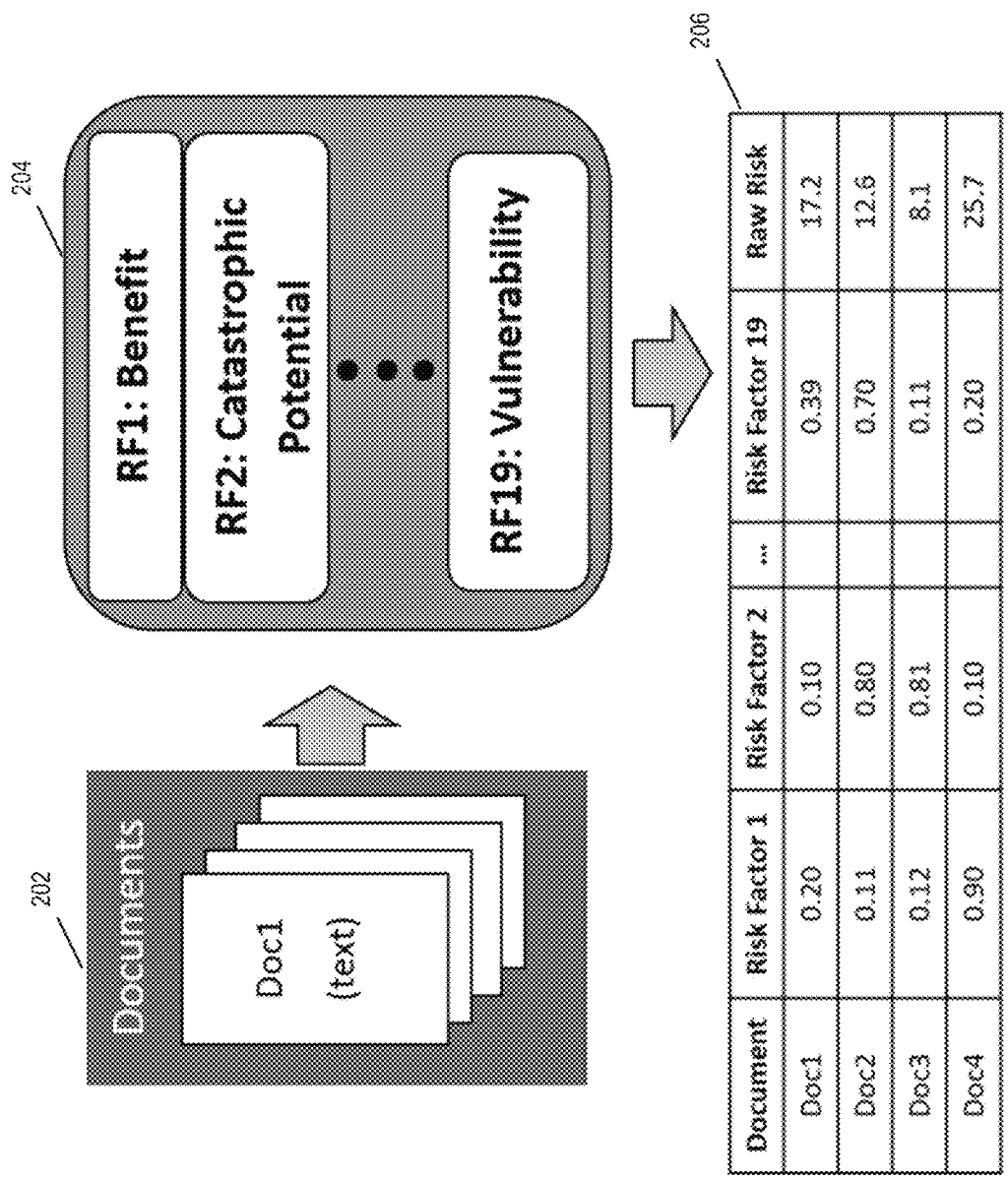
FIG. 2 shows risk factor calculations according to an example of the instant disclosure.

FIG. 2 shows risk factor calculations according to an example of the instant disclosure. FIG. 2 shows a plurality of documents 202 such as Doc1 to DocN. In one example, each document may have text and/or media including images and videos. Additionally, FIG. 2 shows a plurality of risk factors 204 including risk factor one through risk factor nineteen. Each document of the plurality of documents can be analyzed to determine one or more risk factors associated with each document. The risk factors may include benefit, catastrophic potential, communication poor, dread, human origin, immorality, involuntary, irreversibility, media, memory, misunderstood, uncertainty, uncontrollability, unfairness, unfamiliarity, unresponsiveness, untrustworthiness, victim, and vulnerability, among others. Additionally, FIG. 2 shows a table 206 that indicates a document and a risk factor score for each risk factor as well as a raw risk for each document.

The risk factors can be defined as shown below:

Benefit: Emotional concern over the benefit, or lack of benefit, gained in any given circumstance. Risks perceived to have unclear or questionable benefits are perceived to be greater risks than those perceived to have clear benefits.

Catastrophic Potential: Emotional concern over the potential for fatalities, injuries, or illness affecting large groups or occurring frequently over time.

Communication Poor: Emotional concern over the degree to which an issue has been effectively communicated in a comprehensive and timely manner.

Dread: Emotional concern over fear, terror or anxiety evoked by an issue.

Human Origin: Emotional concern due to the risk being caused by human failure or human action. Risks perceived to be generated by human action are less accepted than risks perceived to be caused by nature or "Acts of God."

Immorality: Emotional concern over immoral or unethical risks associated with an issue. Risks perceived to be ethically objectionable or morally wrong are less readily accepted.

Involuntary: Risks where exposure is not based on personal choice are perceived to be greater than risks where exposure is completely voluntary.

Irreversibility: Risks perceived to have potentially irreversible adverse effects are perceived to be greater than risks perceived to have reversible adverse effects.

Media: Emotional concern over the amount of media attention an issue or event receives. Events with a greater potential for media attention are more likely to be perceived as risky.

Memory: Emotional concern over the outcome of a risk being long remembered by the public. Events that have a high probability of being remembered by the general public are perceived as risky.

Misunderstood: Emotional concern over his or her lack of personal understanding of mechanisms or processes involved.

Uncertainty: Emotional concern over unclear or uncertain risks associated with a choice or issue.

Uncontrollability: Risks perceived to be under the control of others are less readily accepted and perceived to be greater than risks perceived to be under the control of the individual. The degree of personal control that an individual can exercise over the risk.

Unfairness: Risks perceived as unevenly and inequitably distributed are less readily accepted than risks perceived as equitably shared.

Unfamiliarity: Emotional concern over unfamiliar or unknown risks from an issue. Risks perceived to be unfamiliar are less readily accepted and perceived to be greater than risks perceived to be familiar.

Unresponsiveness: The extent to which an entity is responding to the perceived risk.

Untrustworthiness: Emotional concern over the amount of deception from the source that is responsible for the risk associated with the issue or event.

Victim: Risks that produce identifiable victims are less readily accepted than risks that produce statistical victims.

Vulnerability: Risks are perceived as more unacceptable to the extent that the populations exposed are unable to effectively cope with the risks involved.

Figure 3:
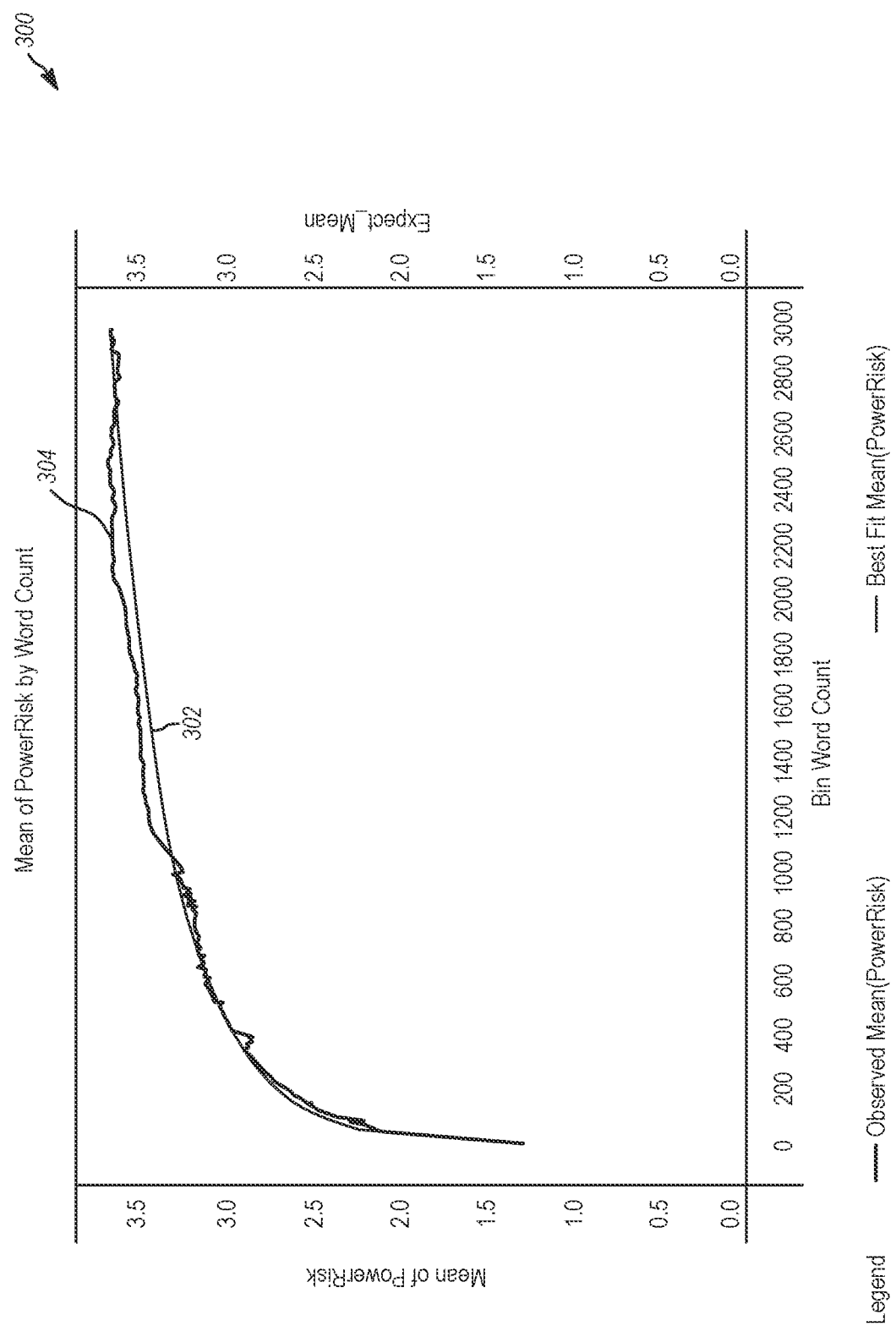
FIG. 3 shows a mean of power risk according to an example of the instant disclosure.

FIG. 3 shows a mean of power risk by word count 300 according to an example of the instant disclosure. FIG. 3 shows the best fit regression model as 302 as well as an observed mean 304. As shown in FIG. 3, one axis of the graph shows a mean of power risk and the other axis shows a word count of documents in the corpus of the plurality of documents.

Figure 4:
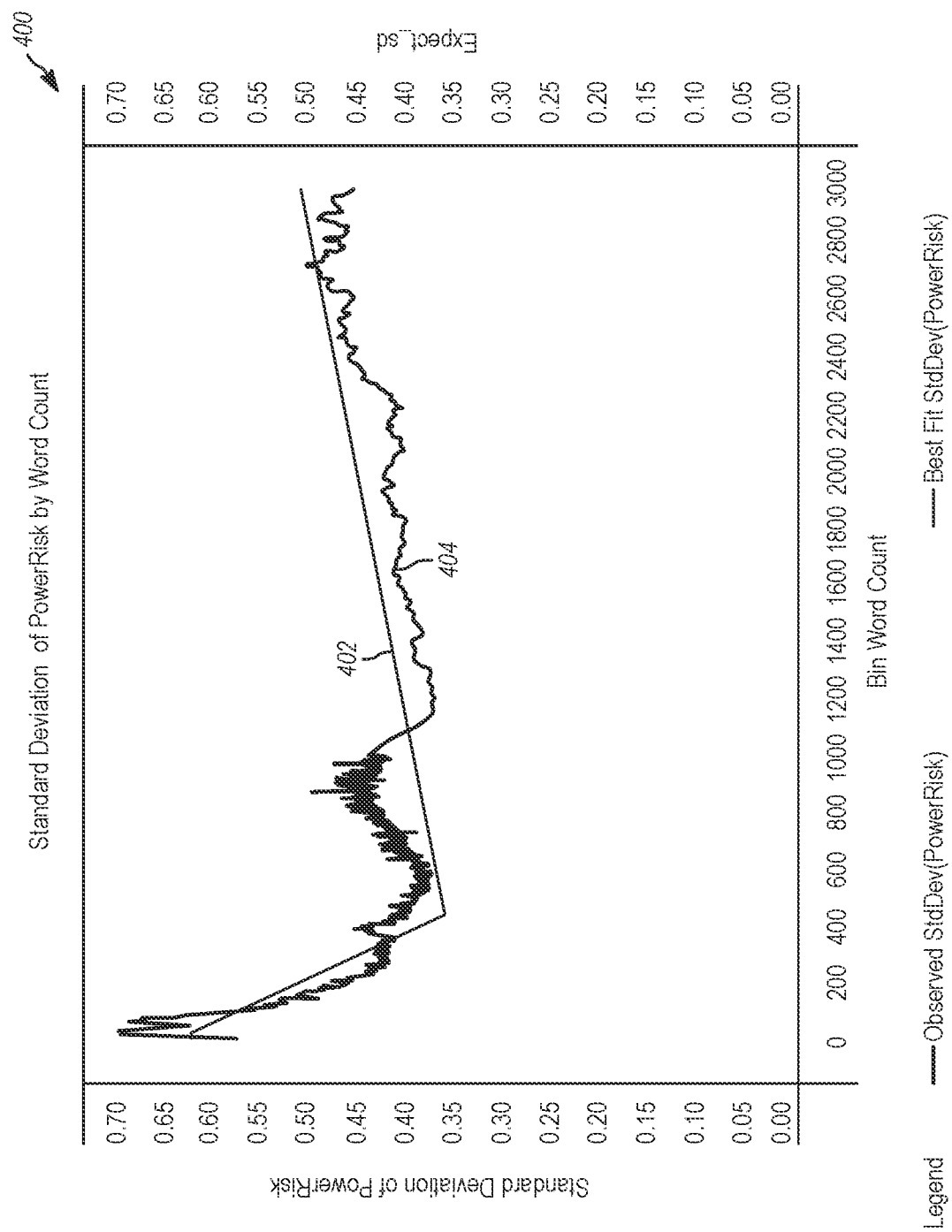
FIG. 4 shows a standard deviation of power risk according to an example of the instant disclosure.

FIG. 4 shows standard deviation of power risk by word count 400 according to an example of the instant disclosure. FIG. 4 shows a best fit regression model 402 as well as an observed standard deviation 404. As shown in FIG. 4, one axis of the graph shows a standard deviation of power risk and the other axis shows a word count of documents in the corpus of the plurality of documents.

Figure 5:
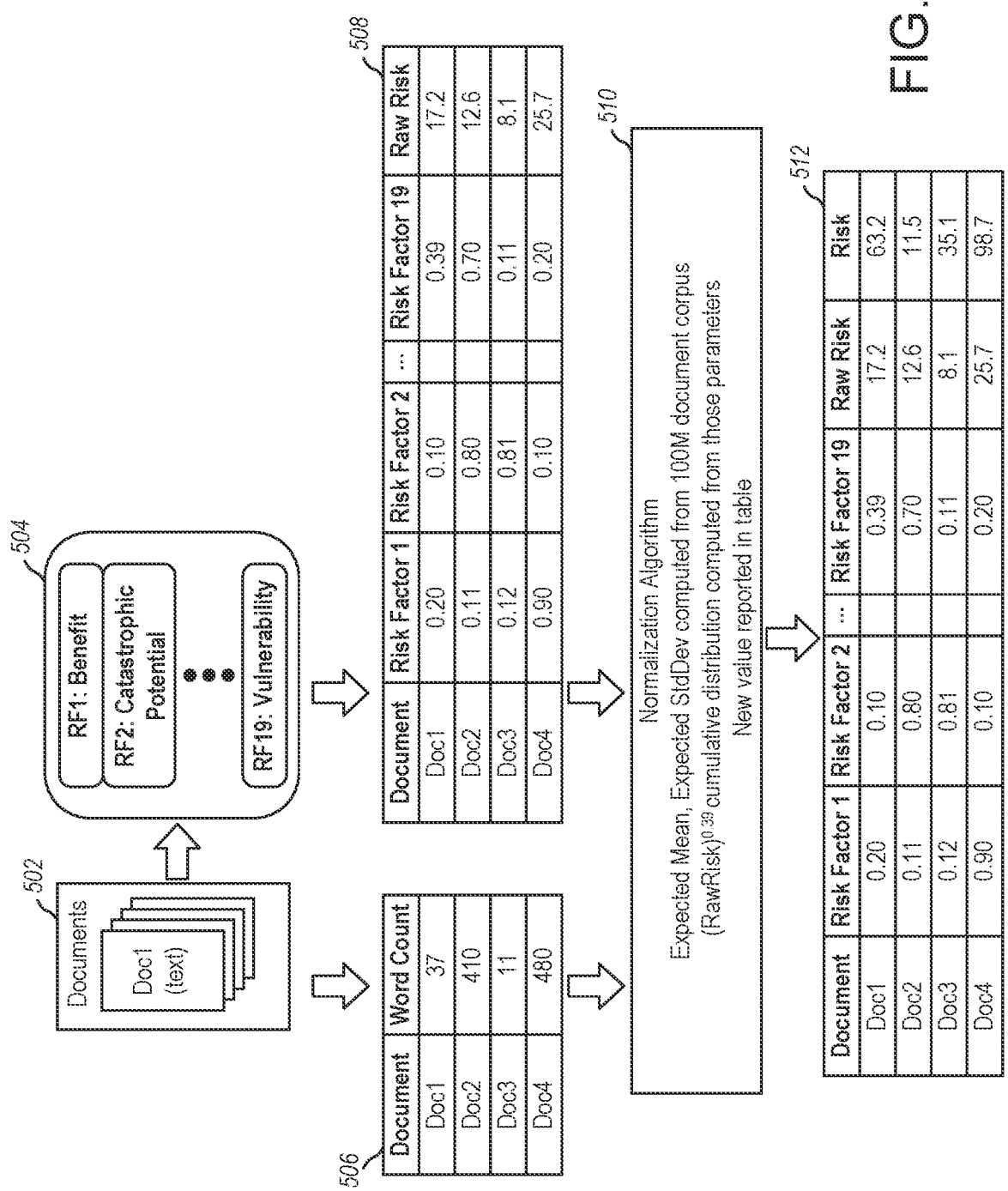
FIG. 5 shows normalized risk factor calculations according to an example of the instant disclosure.

FIG. 5 shows normalized risk factor calculations according to an example of the instant disclosure. As shown in FIG. 5, the system 100 obtains the corpus of documents 502 from a variety of different sources and analyzes each document for each of the nineteen risk factors 504. In addition, the system 100 determines a word count 506 for each of the documents in the corpus. The system 100 further determines a raw risk 508 for each document based on the nineteen risk factors.

Next, the system 100 performs the normalization algorithm 510 by using an expected mean and an expected standard deviation that is determined using the corpus of documents 502. Next, the system 100 determines a risk for each of the documents and this can be inserted into the table for each of the documents as shown at 512. As noted above, the system can utilize the expected mean and expected standard deviation to compute a cumulative density function (cdf) for the best fit distribution in question. The p-value of the PowerRisk in the distribution is then determined. This provides a value from 0 to 1 (the quantile). By multiplying by 100, the system determines a percentile. This can be reported as RiskNormal, or simply as "Risk."

Figure 6:
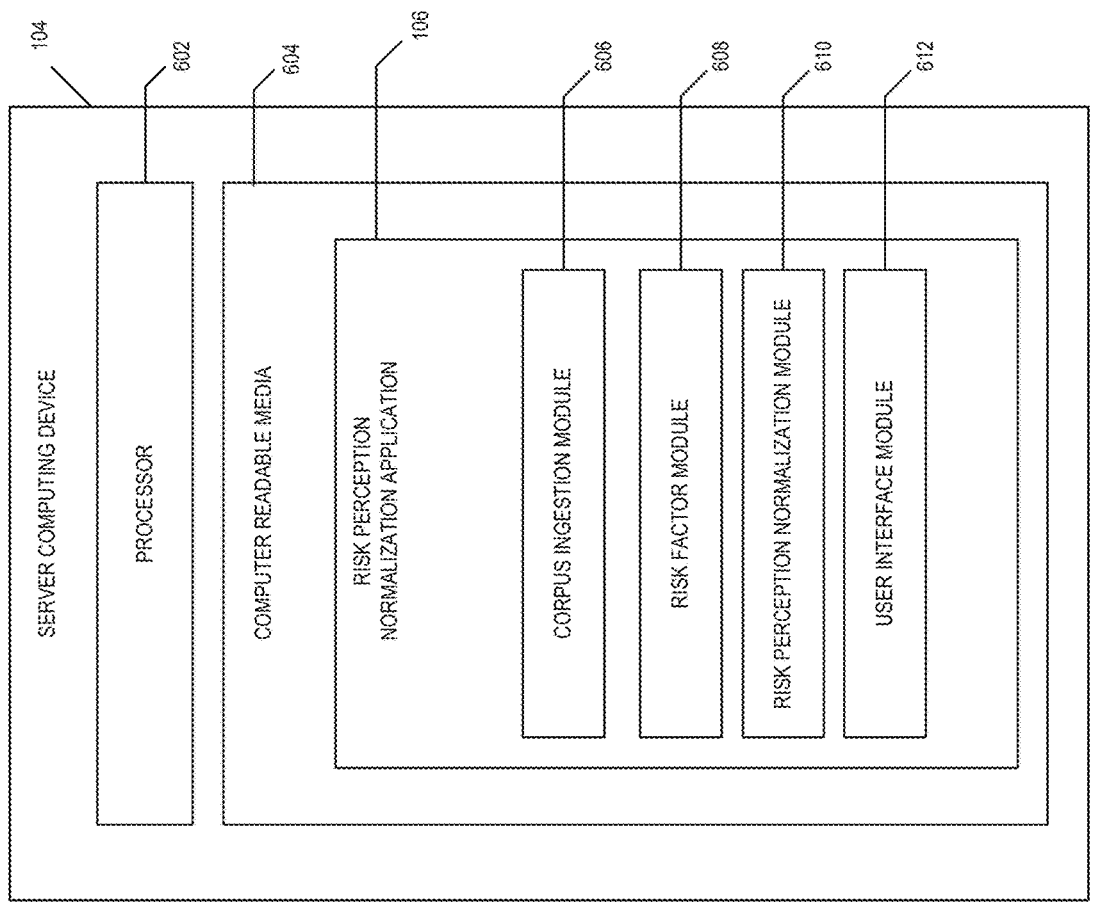
FIG. 6 shows a block diagram of a server computing device of a risk perception normalization system having a risk perception normalization application according to an example of the instant disclosure.

FIG. 6 shows a block diagram of the server computing device 104 of the risk perception normalization system 100 having the risk perception normalization application 106 according to an example of the instant disclosure.

The risk perception normalization application 106 may be executed by the server computing device 104. The server computing device 104 includes computer readable media (CRM) 604 in memory on which risk perception normalization application 106 is stored. The computer readable media 604 may include volatile media, nonvolatile media, removable media, non-removable media, and/or another available medium that can be accessed by the processor 602. By way of example and not limitation, the computer readable media 604 comprises computer storage media and communication media. Computer storage media includes non-transitory storage memory, volatile media, nonvolatile media, removable media, and/or non-removable media implemented in a method or technology for storage of information, such as computer/machine-readable/executable instructions, data structures, program modules, or other data. Communication media may embody computer/machine-readable/executable instructions, data structures, program modules, or other data and include an information delivery media or system, both of which are hardware.

As an example, the risk perception normalization application 106 may include a number of modules as described below. The modules may be Java modules, C modules, or another type of modules.

The risk perception normalization application 106 may include a corpus ingestion module 606 according to an example of the instant disclosure. The corpus ingestion module 606 may receive a very large number of documents from a wide variety of digital media sources, including social media such as TWITTER, blogs, news, and forums, among others. As noted herein, there may be at least one hundred million documents that may be used to train the risk perception normalization application 106. The corpus ingestion module 606 may store the documents and/or a representation of the documents in the database 110.

The risk perception normalization application 106 may include a risk factor module 608 according to an example of the instant disclosure. As noted above, the risk factor module 608 determines a risk factor value for all nineteen risk factors for each document of the corpus of documents. In addition, when a new document is received by the system to be scored and analyzed, the risk factor module 608 receives the document or a representation of the document and determines a risk factor value for all nineteen risk factors.

The risk perception normalization application 106 may include a risk perception normalization module 610 according to an example of the instant disclosure. As noted above, the risk perception normalization module 610 determines an overall risk value for each document by normalizing each document using the expected mean and the expected standard deviation from the document corpus. In addition, the risk perception normalization module determines a RawRisk cumulative distribution and determines the overall normalized risk value for each document in the corpus. In addition, when a new document is received by the system to be scored and analyzed, the risk perception normalization module 610 receives the document or a representation of the document and determines the normalized risk value for the document using the corpus of the plurality of documents.

The risk perception normalization application 106 may include a user interface module 612 according to an example of the instant disclosure. The user interface module 612 may receive requests or other communications from the client computing device 102 and transmits a representation of requested information, user interface elements, and other data and communications to the client computing device 102 for display on the display. As an example, the user interface module 612 generates a native and/or web-based graphical user interface (GUI) that accepts input and provides output by generating content that is transmitted via the communications network 108 and viewed by a user of the client computing device 102. The user interface module 612 may provide realtime automatically and dynamically refreshed information to the user of the client computing device 102 using Java, Javascript, AJAX (Asynchronous Javascript and XML), ASP.NET, Microsoft .NET, and/or node.js, among others. The user interface module 612 may send data to other modules of the risk perception normalization application 106 of the server computing device 104, and retrieve data from other modules of the risk perception normalization application 106 of the server computing device 104 asynchronously without interfering with the display and behavior of the client computing device.

An example of source code associated with the risk perception normalization application 106 is shown below.

```
public Float calculateRiskNormal(Float rawRisk, int wordCount){
  if(rawRisk == 0){
    return 0f;
  }
  double mean;
  double sd;
  wordCount = Math.min(wordCount, 3000);
  double powerRisk = Math.pow(rawRisk, 0.39);
  if(wordCount < 53){
    mean = 0.0178 * (wordCount - 1) + 1.3;
  } else {
    mean = 0.3559 * (Math.log(wordCount) - Math.log(3000)) + 3.6782;
  }
  if(wordCount < 22){
    sd = 0.6281;
  } else if (wordCount > 433){
    sd = (0.5147 - 0.365) / (3000 - 433) * (wordCount - 433) + 0.365;
  } else {
    sd = (0.365 - 0.6281) / (433 - 22) * (wordCount - 22) + 0.6281;
  }
  NormalDistribution n = new NormalDistribution(mean, sd);
  double RiskNormal = 100 * n.cumulativeProbability(powerRisk);
  return (float) RiskNormal;
}
```

Figure 7:
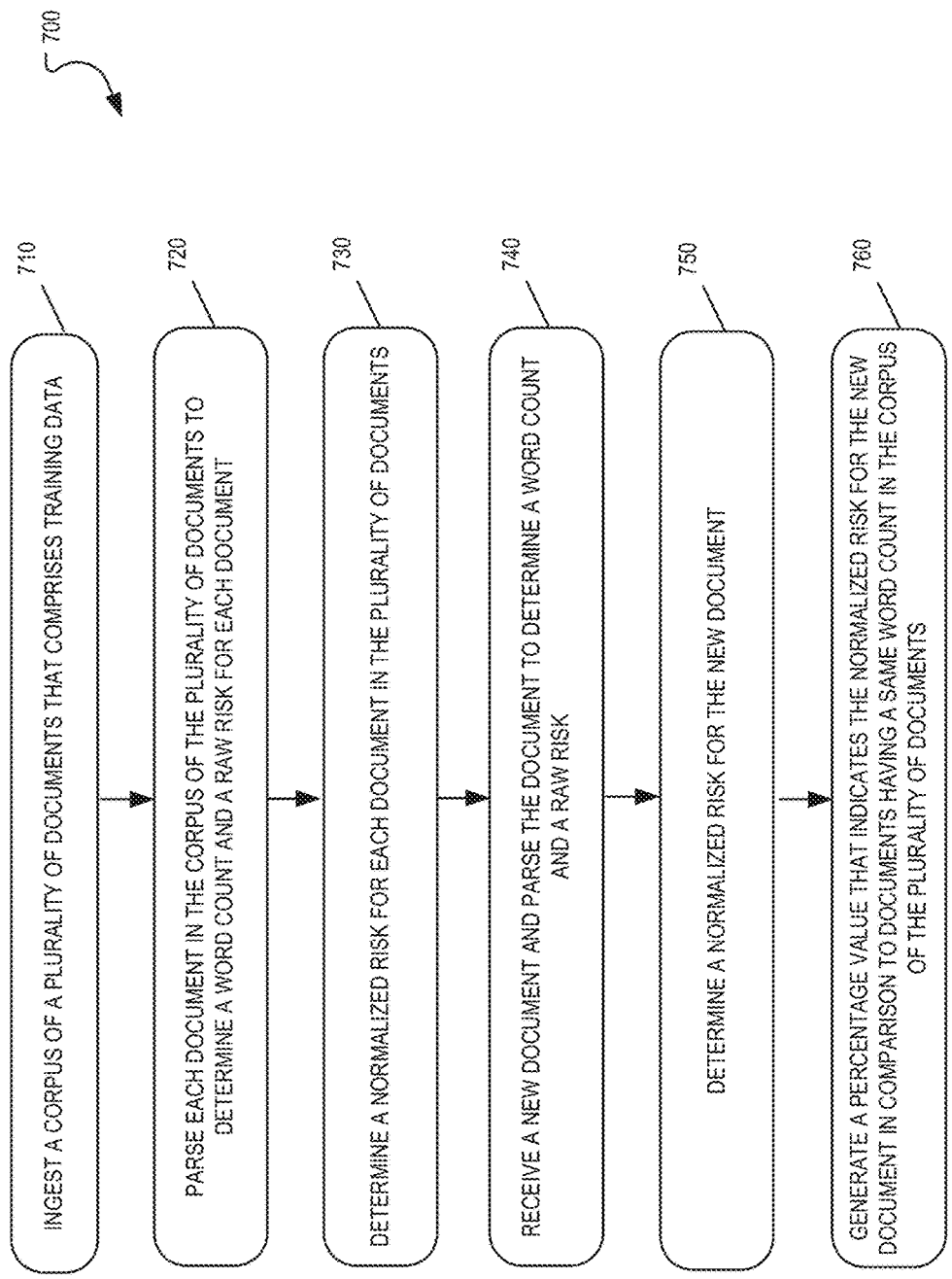
FIG. 7 is a flowchart of a method of determining normalized risk factor values for a document according to an example of the instant disclosure.

FIG. 7 illustrates an example method 700 of determining normalized risk factor values for a document according to an example of the instant disclosure. Although the example method 700 depicts a particular sequence of operations, the sequence may be altered without departing from the scope of the present disclosure. For example, some of the operations depicted may be performed in parallel or in a different sequence that does not materially affect the function of the method 700. In other examples, different components of an example device or system that implements the method 700 may perform functions at substantially the same time or in a specific sequence.

According to some examples, the method 700 may include ingesting a corpus of a plurality of documents that comprises training data at block 710. The corpus of the plurality of documents may include at least one hundred million documents and be ingested into the database 110 and/or a data warehouse, among other locations.

Next, according to some examples, the method 700 may include parsing each document in the corpus of the plurality of documents to determine a word count and a raw risk for each document in the corpus of the plurality of documents at block 720.

Next, according to some examples, the method 700 may include determining a normalized risk for each document in the corpus of the plurality of documents using the word count and the raw risk based on an expected mean and an expected standard deviation based on a power risk that equals raw risk$^{0.39}$ for the corpus of the plurality of documents at block 730. In one example, this may be determined using a JAVA function such as Math.pow(raw risk, 0.39). It also may be written as pow(raw risk, 0.39), (raw risk)^(0.39), and (raw risk)**(0.39), among others.

Next, according to some examples, the method 700 may include receiving a new document and parsing the new document to determine a word count and a raw risk at block 740.

Next, according to some examples, the method 700 may include determining a normalized risk for the new document based on the expected mean and the expected standard deviation based on the power risk that equals raw risk$^{0.39}$ for the corpus of the plurality of documents at block 750.

Next, according to some examples, the method 700 may include generating a percentage value that indicates the normalized risk of the new document in comparison to documents having a same word count in the corpus of the plurality of documents at block 760.

According to some examples, the method 700 may include determining a risk value for at least one risk factor. The at least one risk factor may include benefit, catastrophic potential, communication poor, dread, human origin, immorality, involuntary, irreversibility, media, memory, misunderstood, uncertainty, uncontrollability, unfairness, unfamiliarity, unresponsiveness, untrustworthiness, victim, and vulnerability, among others.

According to some examples, for each document in the plurality of documents, the method 700 may include determining if the word count<53, expectedMean=0.0178*(the word count−1)+1.3 and if the word count>=53, then expectedMean=0.3559*(ln(the word count)−ln(3000))+3.6782.

According to some examples, for each document in the plurality of documents, the method 700 may include determining if the word count<22, expectedStdDev=0.6281, if the word count>=22 and the word count <= 433 expected $StdDev =$
$$\frac{0.365 - 0.6281}{433 - 22} *(\text{the word count} - 22) + 0.6281,$$
and if the word count > 433 expected $StdDev =$
$$\frac{0.5147 - 0.365}{3000 - 433} *(\text{the word count} - 433) + 0.365.$$

According to some examples, the method 700 may include transmitting an alert in realtime to the client computing device 102 when the percentage value that indicates the normalized risk of the new document in comparison documents having a same word count in the corpus of the plurality of documents is above a particular threshold. Alternatively, the method 700 may include automatically responding in the same media channel (for example, refuting a claim that a product is defective), proactively developing a press release, or counter-messaging in other channels. These alerts can also be generated when a collection of documents (for example, all documents from a particular media channel) change over time. In this situation, similar responses are available. The method 700 may include posting an automated response in realtime to at least one social media platform when the percentage value that indicates the normalized risk of the new document in comparison documents having the same word count in the corpus of the plurality of documents is above the particular threshold.

Figure 8:
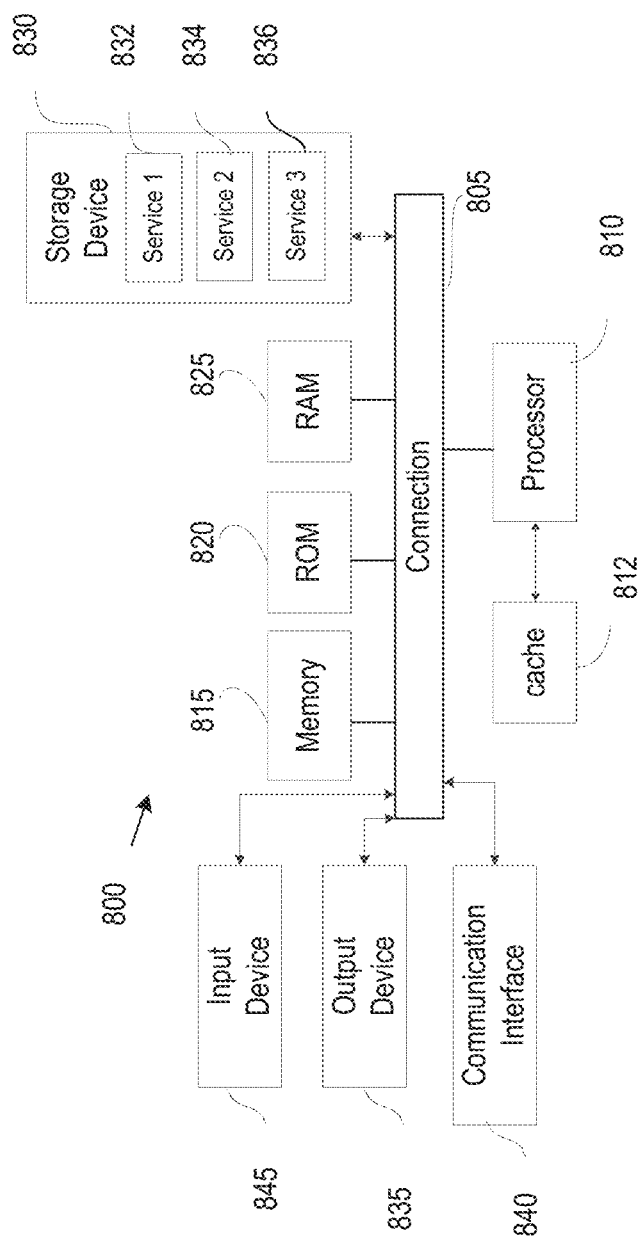
FIG. 8 shows an example of a system for implementing certain aspects of the present technology.

FIG. 8 shows an example of computing system 800, which can be, for example, any computing device making up the computing device such as the client computing device 102, the server computing device 104, or any component thereof in which the components of the system are in communication with each other using connection 805. Connection 805 can be a physical connection via a bus, or a direct connection into processor 810, such as in a chipset architecture. Connection 805 can also be a virtual connection, networked connection, or logical connection.

In some embodiments, computing system 800 is a distributed system in which the functions described in this disclosure can be distributed within a datacenter, multiple data centers, a peer network, etc. In some embodiments, one or more of the described system components represents many such components each performing some or all of the function for which the component is described. In some embodiments, the components can be physical or virtual devices.

Example system 800 includes at least one processing unit (CPU or processor) 810 and connection 805 that couples various system components including system memory 815, such as read-only memory (ROM) 820 and random access memory (RAM) 825 to processor 810. Computing system 800 can include a cache of high-speed memory 812 connected directly with, in close proximity to, or integrated as part of processor 810.

Processor 810 can include any general purpose processor and a hardware service or software service, such as services 832, 834, and 836 stored in storage device 830, configured to control processor 810 as well as a special-purpose processor where software instructions are incorporated into the actual processor design. Processor 810 may essentially be a completely self-contained computing system, containing multiple cores or processors, a bus, memory controller, cache, etc. A multi-core processor may be symmetric or asymmetric.

To enable user interaction, computing system 800 includes an input device 845, which can represent any number of input mechanisms, such as a microphone for speech, a touch-sensitive screen for gesture or graphical input, keyboard, mouse, motion input, speech, etc. Computing system 800 can also include output device 835, which can be one or more of a number of output mechanisms known to those of skill in the art. In some instances, multimodal systems can enable a user to provide multiple types of input/output to communicate with computing system 800. Computing system 800 can include communications interface 840, which can generally govern and manage the user input and system output. There is no restriction on operating on any particular hardware arrangement, and therefore the basic features here may easily be substituted for improved hardware or firmware arrangements as they are developed.

Storage device 830 can be a non-volatile memory device and can be a hard disk or other types of computer readable media which can store data that are accessible by a computer, such as magnetic cassettes, flash memory cards, solid state memory devices, digital versatile disks, cartridges, random access memories (RAMs), read-only memory (ROM), and/or some combination of these devices.

The storage device 830 can include software services, servers, services, etc., that when the code that defines such software is executed by the processor 810, it causes the system to perform a function. In some embodiments, a hardware service that performs a particular function can include the software component stored in a computer-readable medium in connection with the necessary hardware components, such as processor 810, connection 805, output device 835, etc., to carry out the function.

For clarity of explanation, in some instances, the present technology may be presented as including individual functional blocks including functional blocks comprising devices, device components, steps or routines in a method embodied in software, or combinations of hardware and software.

Any of the steps, operations, functions, or processes described herein may be performed or implemented by a combination of hardware and software services or services, alone or in combination with other devices. In some embodiments, a service can be software that resides in memory of a client device and/or one or more servers of a content management system and perform one or more functions when a processor executes the software associated with the service. In some embodiments, a service is a program or a collection of programs that carry out a specific function. In some embodiments, a service can be considered a server. The memory can be a non-transitory computer-readable medium.

In some embodiments, the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer-readable media. Such instructions can comprise, for example, instructions and data which cause or otherwise configure a general purpose computer, special purpose computer, or special purpose processing device to perform a certain function or group of functions. Portions of computer resources used can be accessible over a network. The executable computer instructions may be, for example, binaries, intermediate format instructions such as assembly language, firmware, or source code. Examples of computer-readable media that may be used to store instructions, information used, and/or information created during methods according to described examples include magnetic or optical disks, solid-state memory devices, flash memory, USB devices provided with non-volatile memory, networked storage devices, and so on.

Devices implementing methods according to these disclosures can comprise hardware, firmware and/or software, and can take any of a variety of form factors. Typical examples of such form factors include servers, laptops, smartphones, small form factor personal computers, personal digital assistants, and so on. The functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Illustrative examples of the disclosure include:

Aspect 1: A system comprising: a memory storing computer-readable instructions and at least one processor to execute the instructions to: ingest a corpus of a plurality of documents that comprises training data, parse each document in the corpus of the plurality of documents to determine a word count and a raw risk for each document, determine a normalized risk for each document in the corpus of the plurality of documents using the word count and the raw risk based on an expected mean and an expected standard deviation based on a power risk that equals raw risk$^{0.39}$ for the corpus of the plurality of documents, receive a new document, parse the new document to determine a word count and a raw risk, determine a normalized risk for the new document based on the expected mean and the expected standard deviation based on the power risk that equals raw risk$^{0.39}$ for the corpus of the plurality of documents, and generate a percentage value that indicates the normalized risk of the new document in comparison to documents having a same word count in the corpus of the plurality of documents.

Aspect 2: The system of Aspect 1, wherein the document corpus comprises at least one hundred million documents.

Aspect 3: The system of Aspects 1 and 2, the at least one processor further to determine a risk value for at least one risk factor.

Aspect 4: The system of any of Aspects 1 to 3, wherein the at least one risk factor comprises benefit, catastrophic potential, communication poor, dread, human origin, immorality, involuntary, irreversibility, media, memory, misunderstood, uncertainty, uncontrollability, unfairness, unfamiliarity, unresponsiveness, untrustworthiness, victim, and vulnerability.

Aspect 5: The system of any of Aspects 1 to 4, the at least one processor further to determine if the word count<53, expectedMean=0.0178*(the word count−1)+1.3 and if the word count>=53, then expectedMean=0.3559*(ln(the word count)−ln(3000))+3.6782.

Aspect 6: The system of any of Aspects 1 to 5, the at least one processor further to determine if the word count<22, expectedStdDev=0.6281, if the word count>=22 and the word count <= 433 expected $StdDev =$
$$\frac{0.365 - 0.6281}{433 - 22} *(\text{the word count} - 22) + 0.6281,$$

and if the word count > 433 expected $StdDev =$
$$\frac{0.5147 - 0.365}{3000 - 433} *(\text{the word count} - 433) + 0.365.$$

Aspect 7: The system of any of Aspects 1 to 6, the at least one processor further to transmit an alert in realtime to a client computing device when the percentage value that indicates the normalized risk of the new document in comparison documents having a same word count in the corpus of the plurality of documents is above a particular threshold.

Aspect 8: The system of any of Aspects 1 to 7, the at least one processor further to post an automated response in realtime to at least one social media platform when the percentage value that indicates the normalized risk of the new document in comparison documents having the same word count in the corpus of the plurality of documents is above the particular threshold.

Aspect 9: A method comprising: ingesting, by at least one processor, a corpus of a plurality of documents that comprises training data, parsing, by the at least one processor, each document in the corpus of the plurality of documents to determine a word count and a raw risk for each document, determining, by the at least one processor, a normalized risk for each document in the corpus of the plurality of documents using the word count and the raw risk based on an expected mean and an expected standard deviation based on a power risk that equals raw risk$^{0.39}$ for the corpus of the plurality of documents, receiving, by the at least one processor, a new document, parsing, by the at least one processor, the new document to determine a word count and a raw risk, determining, by the at least one processor, a normalized risk for the new document based on the expected mean and the expected standard deviation based on the power risk that equals raw risk$^{0.39}$ for the corpus of the plurality of documents, and generating, by the at least one processor, a percentage value that indicates the normalized risk of the new document in comparison to documents having a same word count in the corpus of the plurality of documents.

Aspect 10: The method of Aspect 9, wherein the document corpus comprises at least one hundred million documents.

Aspect 11: The method of Aspects 9 and 10, further comprising determining a risk value for at least one risk factor.

Aspect 12: The method of Aspects 9 to 11, wherein the at least one risk factor comprises benefit, catastrophic potential, communication poor, dread, human origin, immorality, involuntary, irreversibility, media, memory, misunderstood, uncertainty, uncontrollability, unfairness, unfamiliarity, unresponsiveness, untrustworthiness, victim, and vulnerability.

Aspect 13: The method of Aspects 9 to 12, further comprising determining if the word count<53, expectedMean=0.0178*(the word count−1)+1.3 and if the word count>=53, then expectedMean=0.3559*(ln(the word count)−ln(3000))+3.6782.

Aspect 14: The method of Aspects 9 to 13, further comprising determining if the word count<22, expectedStdDev=0.6281, if the word count>=22 and the $$\text{expected } StdDev = \frac{0.365 - 0.6281}{433 - 22} * (\text{the word count} - 22) + 0.6281,$$

and if the word count > 433 expected $StdDev =$ $$\frac{0.5147 - 0.365}{3000 - 433} * (\text{the word count} - 433) + 0.365.$$

Aspect 15: The method of Aspects 9 to 14, further comprising transmitting an alert in realtime to a client computing device when the percentage value that indicates the normalized risk of the new document in comparison documents having a same word count in the corpus of the plurality of documents is above a particular threshold.

Aspect 16: The method of Aspects 9 to 15, further comprising posting an automated response in realtime to at least one social media platform when the percentage value that indicates the normalized risk of the new document in comparison documents having the same word count in the corpus of the plurality of documents is above the particular threshold.

Aspect 17: A non-transitory computer-readable storage medium, having instructions stored thereon that, when executed by a computing device cause the computing device to perform operations, the operations comprising ingesting a corpus of a plurality of documents that comprises training data, parsing each document in the corpus of the plurality of documents to determine a word count and a raw risk for each document, determining a normalized risk for each document in the corpus of the plurality of documents using the word count and the raw risk based on an expected mean and an expected standard deviation based on a power risk that equals raw risk$^{0.39}$ for the corpus of the plurality of documents, receiving a new document, parsing the new document to determine a word count and a raw risk, determining a normalized risk for the new document based on the expected mean and the expected standard deviation based on the power risk that equals raw risk$^{0.39}$ for the corpus of the plurality of documents, and generating a percentage value that indicates the normalized risk of the new document in comparison to documents having a same word count in the corpus of the plurality of documents.

Aspect 18: The non-transitory computer-readable storage medium of Aspect 17, the operations further comprising determining if the word count<53, expectedMean=0.0178*(the word count−1)+1.3 and if the word count>=53, then expectedMean=0.3559*(ln(the word count)−ln(3000))+3.6782.

Aspect 19: The non-transitory computer-readable storage medium of Aspects 17 and 18, the operations further comprising determining if the word count<22, expectedStdDev=0.6281, if the word count>=22 and the word count <= 433 expected $StdDev =$ $$\frac{0.365 - 0.6281}{433 - 22} * (\text{the word count} - 22) + 0.6281,$$

and if the word count > 433 expected $StdDev =$ $$\frac{0.5147 - 0.365}{3000 - 433} * (\text{the word count} - 433) + 0.365.$$

Aspect 20: The non-transitory computer-readable storage medium of Aspects 17 to 19, the operations further comprising transmitting an alert in realtime to a client computing device when the percentage value that indicates the normalized risk of the new document in comparison documents having a same word count in the corpus of the plurality of documents is above a particular threshold.

What is claimed is:

1. A system comprising:
a memory storing computer-readable instructions; and
at least one processor to execute the instructions to:
ingest a corpus of a plurality of documents that comprises training data;
parse each document in the corpus of the plurality of documents to determine a word count and a raw risk for each document;
determine a normalized risk for each document in the corpus of the plurality of documents using the word count and the raw risk based on an expected mean and an expected standard deviation based on a power risk that equals raw risk$^{0.39}$ for the corpus of the plurality of documents;
receive a new document;
parse the new document to determine a word count and a raw risk for the new document;
determine a normalized risk for the new document based on the expected mean and the expected standard deviation based on the power risk that equals raw risk$^{0.39}$ for the corpus of the plurality of documents;
generate a percentage value that indicates the normalized risk of the new document in comparison to documents having a same word count as the word count for the new document in the corpus of the plurality of documents; and
transmit an alert in realtime to a client computing device when the percentage value that indicates the normalized risk of the new document in comparison to documents having a same word count in the corpus of the plurality of documents is above a particular threshold.

2. The system of claim 1, wherein the corpus of the plurality of documents comprises at least one hundred million documents.

3. The system of claim 1, the at least one processor further to determine a risk value for at least one risk factor.

4. The system of claim 3, wherein the at least one risk factor comprises benefit, catastrophic potential, communication poor, dread, human origin, immorality, involuntary, irreversibility, media, memory, misunderstood, uncertainty, uncontrollability, unfairness, unfamiliarity, unresponsiveness, untrustworthiness, victim, and vulnerability.

5. The system of claim 1, the at least one processor further to determine if the word count<53, expectedMean=0.0178*(the word count−1)+1.3 and if the word count>=53, then expectedMean=0.3559*(ln(the word count)−ln(3000))+3.6782.

6. The system of claim 1, the at least one processor further to determine if the word count<22, expectedStdDev=0.6281, if word count>=22 and the word count <= 433 $expectedStdDev =$ $$\frac{0365 - 0.6281}{433 - 22} * (\text{the world count} - 22) + 0.6281,$$

and if the word count > 433 $expectedStdDev =$ $$\frac{05147 - 0365}{3000 - 433} * (\text{the word count} - 433) + 0.365.$$

7. The system of claim 1, the at least one processor further to post an automated response in realtime to at least one social media platform when the percentage value that indicates the normalized risk of the new document in comparison to documents having the same word count in the corpus of the plurality of documents is above the particular threshold.

8. A method comprising:
ingesting, by at least one processor, a corpus of a plurality of documents that comprises training data;
parsing, by the at least one processor, each document in the corpus of the plurality of documents to determine a word count and a raw risk for each document;
determining, by the at least one processor, a normalized risk for each document in the corpus of the plurality of documents using the word count and the raw risk based on an expected mean and an expected standard deviation based on a power risk that equals raw risk$^{0.39}$ for the corpus of the plurality of documents;
receiving, by the at least one processor, a new document;
parsing, by the at least one processor, the new document to determine a word count and a raw risk for the new document;
determining, by the at least one processor, a normalized risk for the new document based on the expected mean and the expected standard deviation based on the power risk that equals raw risk$^{0.39}$ for the corpus of the plurality of documents;
generating, by the at least one processor, a percentage value that indicates the normalized risk of the new document in comparison to documents having a same word count as the word count for the new document in the corpus of the plurality of documents; and
transmitting an alert in realtime to a client computing device when the percentage value that indicates the normalized risk of the new document in comparison to documents having a same word count in the corpus of the plurality of documents is above a particular threshold.

9. The method of claim 8, wherein the corpus of the plurality of documents comprises at least one hundred million documents.

10. The method of claim 8, further comprising determining a risk value for at least one risk factor.

11. The method of claim 10, wherein the at least one risk factor comprises benefit, catastrophic potential, communication poor, dread, human origin, immorality, involuntary, irreversibility, media, memory, misunderstood, uncertainty, uncontrollability, unfairness, unfamiliarity, unresponsiveness, untrustworthiness, victim, and vulnerability.

12. The method of claim 8, further comprising determining if the word count<53, expectedMean=0.0178*(the word count−1)+1.3 and if the word count>=53, then expectedMean=0.3559*(ln(the word count)−ln(3000))+3.6782.

13. The method of claim 8, further comprising determining if the word count<22, expectedStdDev=0.6281, if the word count>=22 and the word count <= 433 expected $StdDev =$ $$\frac{0.365 - 0.6281}{433 - 22} * (\text{the word count} - 22) + 0.6281,$$

and if the word count > 433 expected $StdDev =$ $$\frac{0.5147 - 0.365}{3000 - 433} * (\text{the word count} - 433) + 0.365.$$

14. The method of claim 8, further comprising posting an automated response in realtime to at least one social media platform when the percentage value that indicates the normalized risk of the new document in comparison to documents having the same word count in the corpus of the plurality of documents is above the particular threshold.

15. A non-transitory computer-readable storage medium, having instructions stored thereon that, when executed by a computing device cause the computing device to perform operations, the operations comprising:
ingesting a corpus of a plurality of documents that comprises training data;
parsing each document in the corpus of the plurality of documents to determine a word count and a raw risk for each document;
determining a normalized risk for each document in the corpus of the plurality of documents using the word count and the raw risk based on an expected mean and an expected standard deviation based on a power risk that equals raw risk$^{0.39}$ for the corpus of the plurality of documents;
receiving a new document;
parsing the new document to determine a word count and a raw risk for the new document;
determining a normalized risk for the new document based on the expected mean and the expected standard deviation based on the power risk that equals raw risk$^{0.39}$ for the corpus of the plurality of documents;
generating a percentage value that indicates the normalized risk of the new document in comparison to documents having a same word count as the word count for the new document in the corpus of the plurality of documents; and
transmitting an alert in realtime to a client computing device when the percentage value that indicates the normalized risk of the new document in comparison to documents having a same word count in the corpus of the plurality of documents is above a particular threshold.

16. The non-transitory computer-readable medium of claim 15, the operations further comprising determining if the word count<53, expectedMean=0.0178*(the word count−1)+1.3 and if the word count>=53, then expectedMean=0.3559*(ln(the word count)−ln(3000))+3.6782.

17. The non-transitory computer-readable medium of claim 15, the operations further comprising determining if the word count<22, expectedStdDev=0.6281, if the word count>=22 and the word count <= 433 expected $StdDev =$ $$\frac{0.365 - 0.6281}{433 - 22} * (\text{the word count} - 22) + 0.6281,$$

and if the word count > 433 expected $StdDev =$ $$\frac{0.5147 - 0.365}{3000 - 433} * (\text{the word count} - 433) + 0.365.$$

* * * * *